(12) United States Patent
Larmo et al.

(10) Patent No.: US 11,838,889 B2
(45) Date of Patent: *Dec. 5, 2023

(54) METHODS AND NODES FOR FACILITATING POSITIONING DETERMINATION IN A WI-FI COMMUNICATION NETWORK

(71) Applicant: Telefonaktiebolaget LM Ericsson (publ), Stockholm (SE)

(72) Inventors: Anna Larmo, Espoo (FI); Rocco Di Taranto, Lund (SE); Thomas Nilsson, Malmö (SE); Dennis Sundman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,302

(22) Filed: Oct. 7, 2021

(65) Prior Publication Data

US 2022/0030542 A1 Jan. 27, 2022

Related U.S. Application Data

(63) Continuation of application No. 16/759,514, filed as application No. PCT/SE2017/051058 on Oct. 27, 2017, now Pat. No. 11,172,461.

(51) Int. Cl.
*H04W 24/00* (2009.01)
*H04W 64/00* (2009.01)
(Continued)

(52) U.S. Cl.
CPC ..... *H04W 64/003* (2013.01); *H04W 72/0453* (2013.01); *H04W 84/12* (2013.01)

(58) Field of Classification Search
CPC .......... H04W 64/003; H04W 72/0453
See application file for complete search history.

(56) References Cited

U.S. PATENT DOCUMENTS 11,172,461 B2 * 11/2021 Larmo ................ H04W 64/003
2015/0049716 A1    2/2015 Gutierrez et al.
(Continued)

FOREIGN PATENT DOCUMENTS

CN    102707259 A    10/2012
CN    103314613 A    9/2013
(Continued)

OTHER PUBLICATIONS

Pandey, Santosh, et al., "NGP Use Case Template", doc .: IEEE 802.11-16/0137r4, Mar. 12, 2016, pp. 1-35.
(Continued)

*Primary Examiner* — Erika A Washington
(74) *Attorney, Agent, or Firm* — Murphy, Bilak & Homiller, PLLC

(57) ABSTRACT

Methods for facilitating positioning determination in a Wi-Fi communication network are disclosed. An example method comprises sending, to a responding communication node, a request to start a position-related determination procedure and information of a first plurality of frequency bands over which the initiating communication node is able to communicate. The method further comprises receiving, from the responding communication node, second information related to a second number of frequency bands over which the responding communication node is able to communicate, and triggering start of the position-related determination procedure based on the received second information so that the position-related determination procedure is performed over at least one of a third number of frequency bands that occurs in both the first plurality of frequency bands and the second number of frequency bands.

17 Claims, 10 Drawing Sheets

(51) Int. Cl.
*H04W 72/0453* (2023.01)
*H04W 84/12* (2009.01)

(56) References Cited

U.S. PATENT DOCUMENTS

| | | |
|---|---|---|
| 2016/0150499 A1 | 5/2016 | Aldana et al. |
| 2017/0013412 A1 | 1/2017 | Steiner |
| 2017/0045627 A1 | 2/2017 | Arsson et al. |
| 2017/0280414 A1 | 9/2017 | Gidvani et al. |
| 2017/0295004 A1 | 10/2017 | Amizur et al. |
| 2019/0069267 A1 | 2/2019 | Seok et al. |

FOREIGN PATENT DOCUMENTS

| | | |
|---|---|---|
| CN | 107079399 A | 8/2017 |
| CN | 107113049 A | 8/2017 |
| CN | 107209249 A | 9/2017 |
| JP | 2008535398 A | 8/2008 |
| RU | 2494575 C2 | 9/2013 |
| RU | 2613730 C2 | 3/2017 |

OTHER PUBLICATIONS

Unknown, Author, "Introduction of WLAN AP assistance data and UE-based WLAN positioning method", 3GPP TSG-RAN WG2 Meeting #95; R2-165427; Gothenburg, Sweden, Aug. 22-26, 2016, pp. 1-6.

Unknown, Author, "Introduction of WLAN AP assistance data for WLAN FTM positioning method", 3GPP TSG-RAN WG2 Meeting #95; R2-165419; Gothenburg, Sweden, Aug. 22-26, 2016, pp. 1-10.

Vaughn, Rodney, et al., "Channels, Propagation and Antennas for Mobile Communication", IET Electromagnetic Waves Series 50, 2003, pp. 1-785.

* cited by examiner

Table 9-258— Format And Bandwidth field

| Field Value | Format | Bandwidth (MHz) |
|---|---|---|
| 0 | No preference | No preference |
| 1-3 | Reserved | Reserved |
| 4 | Non-HT | 5 |
| 5 | Reserved | Reserved |
| 6 | Non-HT | 10 |
| 7 | Reserved | Reserved |
| 8 | Non-HT, excluding Clause 15 (DSSS PHY specification for the 2.4 GHz band designated for ISM applications) and Clause 16 (High rate direct sequence spread spectrum (HR/DSSS) PHY specification) | 20 |
| 9 | HT mixed | 20 |
| 10 | VHT | 20 |
| 11 | HT mixed | 40 |
| 12 | VHT | 40 |
| 13 | VHT | 80 |
| 14 | VHT | 80+80 |
| 15 | VHT (two separate RF LOs) | 160 |
| 16 | VHT (single RF LO) | 160 |
| 17-30 | Reserved | Reserved |
| 31 | DMG | 2160 |
| 32-63 | Reserved | Reserved |

Fig. 5

| B72-B75 | Sub GHz | 2.4GHz | 5GHz | 60GHz |
|---|---|---|---|---|
| 0001 | Not available | Not available | Not available | Available |
| 0010 | Not available | Not available | Available | Not available |
| 0011 | Not available | Not available | Available | Available |
| 0100 | Not available | Available | Not available | Not available |
| ... | ... | ... | ... | ... |

Fig. 9

| Field Value | Sub GHz | 2.4GHz | 5GHz | 60GHz |
|---|---|---|---|---|
| 33 | FTM available | Not FTM available | Not FTM available | Not FTM Available |
| 33 | FTM available | FTM available | Not FTM available | Not FTM available |
| 34 | FTM available | FTM available | FTM available | Not FTM available |
| ... | ... | ... | ... | ... |
| 48 | FTM available | FTM available | FTM available | FTM available |

Fig. 10

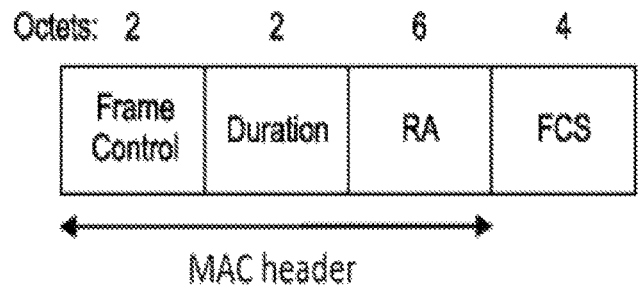
Fig. 11
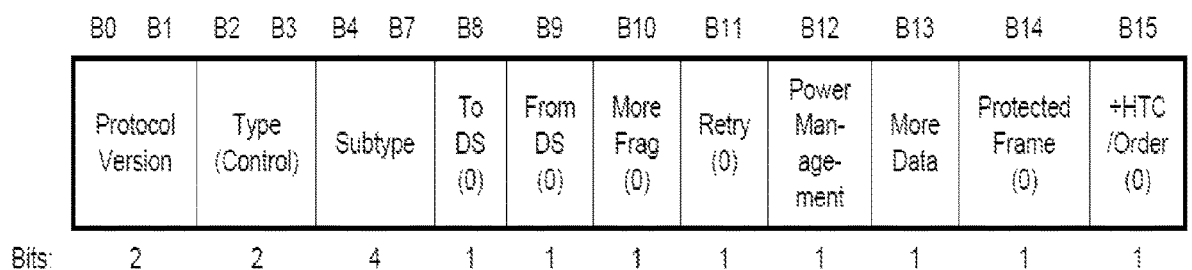
Fig. 12
| Protocol Version | Carrier Frequency to use for FTM exchange |
|---|---|
| 00 | Sub GHz |
| 01 | 2.4 GHz |
| 10 | 5 GHz |
| 11 | 60 GHz |
Fig. 13

METHODS AND NODES FOR FACILITATING POSITIONING DETERMINATION IN A WI-FI COMMUNICATION NETWORK

TECHNICAL FIELD

The present disclosure relates generally to methods and communication nodes for facilitating positioning determination in a Wi-Fi communication network. More specifically, the present disclosure relates to methods, initiating communication nodes and responding communication nodes for facilitating positioning determination in a Wi-Fi communication network.

BACKGROUND

In the wirelessly connected society of today, there are lots of services that depend on precise location determination, such as location-dependent services provided to users of wireless communication devices connected to wireless communication networks. There are different technologies for providing wireless access to communication devices of a wireless communication network. One such wireless communication technology is Wi-Fi. Wi-Fi is defined in the standard IEEE 802.11. IEEE 802.11 is a set of Medium Access Control, MAC, and physical layer, PHY, specifications for implementing wireless local area network, WLAN, communication in unlicensed frequency bands.

Current standardized technologies already enable Wi-Fi based location dependent services such as navigation for pedestrians. Specifically, the Wi-Fi standard IEEE 802.11-2016 "Part 11: Wireless LAN Medium Access Control (MAC) and Physical Layer (PHY) Specifications", published Dec. 7, 2016, defines a prior art Fine Time Measurement, FTM, procedure which allows location precision to ~3 m using 802.11n/ac. The FTM procedure is used for measuring the distance between communication nodes in Wi-Fi. The procedure is based on recording the time points at which packets are transmitted and received. Basically, a first time point $t_1$ is recorded at a first communication node when a FTM packet is sent from the first node, and a second time point $t_2$ is recorded at a second communication node when the FTM packet is received at the second node. Then the time of flight, ToF is determined as $t_2-t_1$. From the determined time of flight, the distance between the first and second communication nodes can be determined. By sending a plurality of such packets between the first and second communication nodes, in both direction, a distance measurement accuracy of approximately 3 m can be achieved, as mentioned. Similar ToF measurements and distances determined from packets sent between the first communication node and other communication nodes may then be used together with the determined distance between the first and second communication node in order to determine the position of the first communication node using e.g., triangulation.

However, in WLANs other usages and services need better precision accuracy than what can be achieved from the IEEE 802.11-2016 FTM procedure. Examples of such usages and services are:

1) Micro-location—a more robust, accurate and precise location service with precision at or less than 0.1 meters, to for example provide guidance to a product on a specific shelf, or at a store entrance, or to identify users' preference, etc.;
2) A highly scalable indoor positioning system for crowded metro stations and stadiums with reduced overhead;
3) Wireless Wi-Fi communication station, STA, to STA positioning for peer to peer connectivity and decision making;
4) Direction finding, e.g., people visiting a museum/store would like to get guidance on exhibits in an exhibition, to articles on a high shelf.

To meet these needs, a IEEE 802.11 Next Generation Positioning, NGP, study group, a Task Group in 802.11az, initiated its work on September 2015. Its scope is to "define modifications to both the IEEE 802.11 MAC and PHY of High Throughput, HT, Very High Throughput, VHT, Directional Multi Gigabit, DMG, and PHYs under concurrent development, e.g., High Efficiency, HE, Next Generation 60 GHz, NG60, which enables determination of absolute and relative positions with better accuracy with respect to FTM protocol executing on the same PHY type, while reducing existing wireless medium use and power consumption and is scalable to dense deployments."

As shown above, there is an immediate interest of finding methods for determining the distance between communication nodes of a Wi-Fi communication network with better accuracy than what is possible with today's methods.

SUMMARY

It is an object of the invention to address at least some of the problems and issues outlined above. It is possible to achieve these objects and others by using methods and communication nodes as defined in the attached independent claims.

According to one aspect, a method is provided, performed by an initiating communication node for facilitating positioning determination in a Wi-Fi communication network. The Wi-Fi communication network comprises the initiating communication node and a responding communication node that is in wireless communication with the initiating communication node. The method comprises sending, to the responding communication node, a request to start a position-related determination procedure, and sending, to the responding communication node, information of a first plurality of frequency bands over which the initiating communication node is able to communicate. The method further comprises receiving second information from the responding communication node, the second information being related to a second number of frequency bands over which the responding communication node is able to communicate, and triggering start of the position-related determination procedure based on the received second information so that the position-related determination procedure is performed over at least one of a third number of frequency bands that occurs in both the first plurality of frequency bands and the second number of frequency bands.

According to another aspect, a method is provided, performed by a responding communication node, for facilitating positioning determination in a Wi-Fi communication network. The Wi-Fi communication network comprises the responding communication node and an initiating communication node, which is in wireless communication with the responding communication node. The method comprises receiving, from the initiating communication node, a request to start a position-related determination procedure, and receiving, from the initiating communication node, information of a first plurality of frequency bands over which the initiating communication node is able to communicate. The method further comprises sending second information to the initiating communication node, the second information being related to over which frequency bands the initiating communication node is to start the position-related determination procedure, the second information being based on the information of first plurality of frequency bands and on information of a second number of frequency bands over which the responding communication node is able to communicate, and receiving, from the initiating communication node, a message triggering start of the position-related determination procedure over at least one of a third number of frequency bands that occurs in both the first plurality of frequency bands and in the second number of frequency bands.

According to another aspect, an initiating communication node is provided, operable in a Wi-Fi communication network. The Wi-Fi communication network comprises the initiating communication node and a responding communication node configured to be in wireless communication with the initiating communication node. The initiating communication node comprises a processor and a memory. The memory contains instructions executable by said processor, whereby the initiating communication node is operative for sending, to the responding communication node, a request to start a position-related determination procedure and sending, to the responding communication node, information of a first plurality of frequency bands over which the initiating communication node is able to communicate. The initiating communication node is further operative for receiving second information from the responding communication node, the second information being related to a second number of frequency bands over which the responding communication node is able to communicate, and triggering start of the position-related determination procedure based on the received second information so that the position-related determination procedure is performed over at least one of a third number of frequency bands that occurs in both the first plurality of frequency bands and the second number of frequency bands.

According to another embodiment, a responding communication node is provided, operable in a Wi-Fi communication network. The Wi-Fi communication network comprises the responding communication node and an initiating communication node configured to be in wireless communication with the responding communication node. The responding communication node comprises a processor and a memory. The memory contains instructions executable by said processor, whereby the responding communication node is operative for receiving, from the initiating communication node, a request to start a position-related determination procedure, and receiving, from the initiating communication node, information of a first plurality of frequency bands over which the initiating communication node is able to communicate. The responding communication node is further operative for sending second information to the initiating communication node, the second information being related to over which frequency bands the initiating communication node is to start the position-related determination procedure, the second information being based on the information of first plurality of frequency bands and on information of a second number of frequency bands over which the responding communication node is able to communicate, and for receiving, from the initiating communication node, a message triggering start of the position-related determination procedure over at least one of a third number of frequency bands that occurs in both the first plurality of frequency bands and in the second number of frequency bands.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIG. 5 is a table showing a Format and Bandwidth sub-field of the FTM Parameters field according to prior art.

FIG. 9 is a table of possible meanings of bit values of bits B72-B75 of the FTM parameters field of FIG. 8, according to an embodiment.

FIG. 10 is a table of possible meanings of bit values of bits B50-B55 of the FTM Parameters field of FIG. 8, according to an embodiment.

FIG. 11 is a block diagram showing an ACK frame of the FTM procedure according to prior art.

FIG. 12 is a block diagram showing a Frame control sub-field of the ACK frame of the FTM procedure according to prior art.

FIG. 13 is a table of possible meanings of bit values of bits B0-B1 of the Frame control sub-field, according to an embodiment.

DETAILED DESCRIPTION

Figure 1:
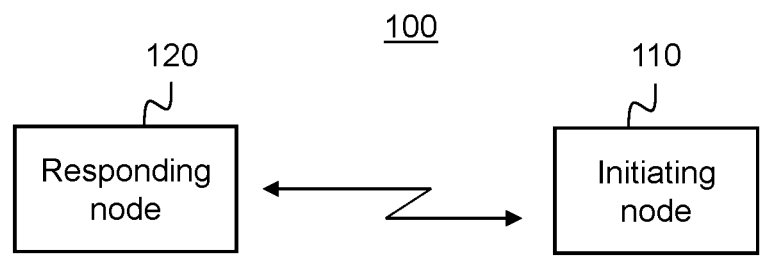
FIGS. 1 and 2 are schematic block diagrams of communication scenarios in a Wi-Fi communication network.

FIG. 1 shows a communication scenario in which the present invention may be used. FIG. 1 shows a Wi-Fi communication network 100 comprising an initiating communication node 110 and a responding communication node 120. The initiating communication node 110 and the responding communication node 120 are configured to be in wireless communication with each other using Wi-Fi. According to an embodiment, the initiating communication node 110 is a communication node initiating a position-related determination procedure, also called a position determination related procedure, or the communication node sending a request to start a position-related determination procedure. The responding communication node, on the other hand, is a communication node receiving a message from the initiating communication node regarding the initiation of the position-related determination procedure, or a communication node receiving the request from the initiating communication node regarding starting of the position-related determination procedure.

According to a first embodiment, the initiating communication node 110 as well as the responding communication node 120 are wireless communication stations, STAs. This may be the case in a peer-to-peer Wi-Fi communication network.

Figure 2:
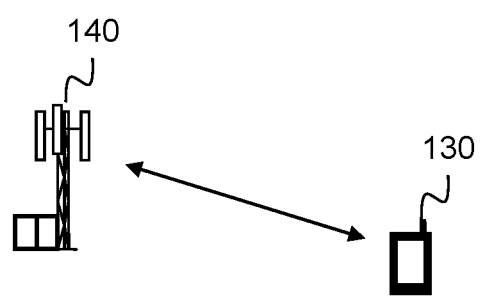

FIG. 2 shows another embodiment, in which the initiating communication node 110 is a Wi-Fi access point 130 and the responding communication node 120 is an STA, 140 or vice versa.

In IEEE 802.11 there are many different frequency bands over which Wi-Fi communication can take place. For example, the frequency bands of 802.11az are sub-1 GHz, 2.4 GHz, 5 GHz and 60 GHz. Different frequency bands have different wireless propagation characteristics. As a result, different positioning accuracy can be obtained at different frequency bands depending on the propagation conditions for the moment. Also, the available bandwidth at the different frequency bands can vary. This is described in R. Vaughan et al "Channel, Propagation and Antennas for Mobile Communications", IET Digital Library, 2003.

The prior art FTM procedure used for determining Wi-Fi communication node position today only uses a single frequency band for the wireless communication stations, STAs. However, future wireless communication stations are expected to be able to communicate over a plurality of frequency bands spread out over a wide frequency range. As described above, if an STA communicates as stipulated in 802.11az, it is expected to be able to communicate over the four different frequency bands stated above, i.e., sub-1 GHz, 2.4 GHz, 5 GHz and 60 GHz. The inventors have now found out that for the future STAs, the positioning determination accuracy can be improved if the FTM procedure, or any other similar position-related determination procedure, takes measurements from many different frequency bands into consideration. For example, the frequency band that is expected to have the best measurement accuracy for the moment is selected for positioning determination, or position determination measurement from many frequency bands are used at the same time, i.e., combined into for example one weighted position determination value, in order to achieve better accuracy.

In order to be able to select which frequency band or bands to use for achieving a better position determination in a Wi-Fi communication network, the involved wireless communication nodes need to handshake which communication frequency bands they have in common. When this is done, one of the wireless communication nodes triggers start of the position-related determination procedure, e.g., a measurement phase of an FTM procedure at one or more of the common frequency bands. Which frequency band or bands to select for the position-related determination procedure may be determined based on current wireless signal propagation conditions, and characteristics for the different common frequency bands.

According to some embodiments of the present invention, different possible improvements to the prior art FTM procedure is suggested. Before describing different embodiments of the invention, the prior art FTM procedure as described in IEEE 802.11-2016 Part 11 is therefore described.

IEEE 802.11 has specified the FTM procedure to measure the distance between Wi-Fi nodes. The procedure is composed of three phases, i.e., a negotiation phase, a measurement exchange phase and a termination phase. The prior art negotiation and measurement exchange phase are described in FIG. 3.

Figure 4:
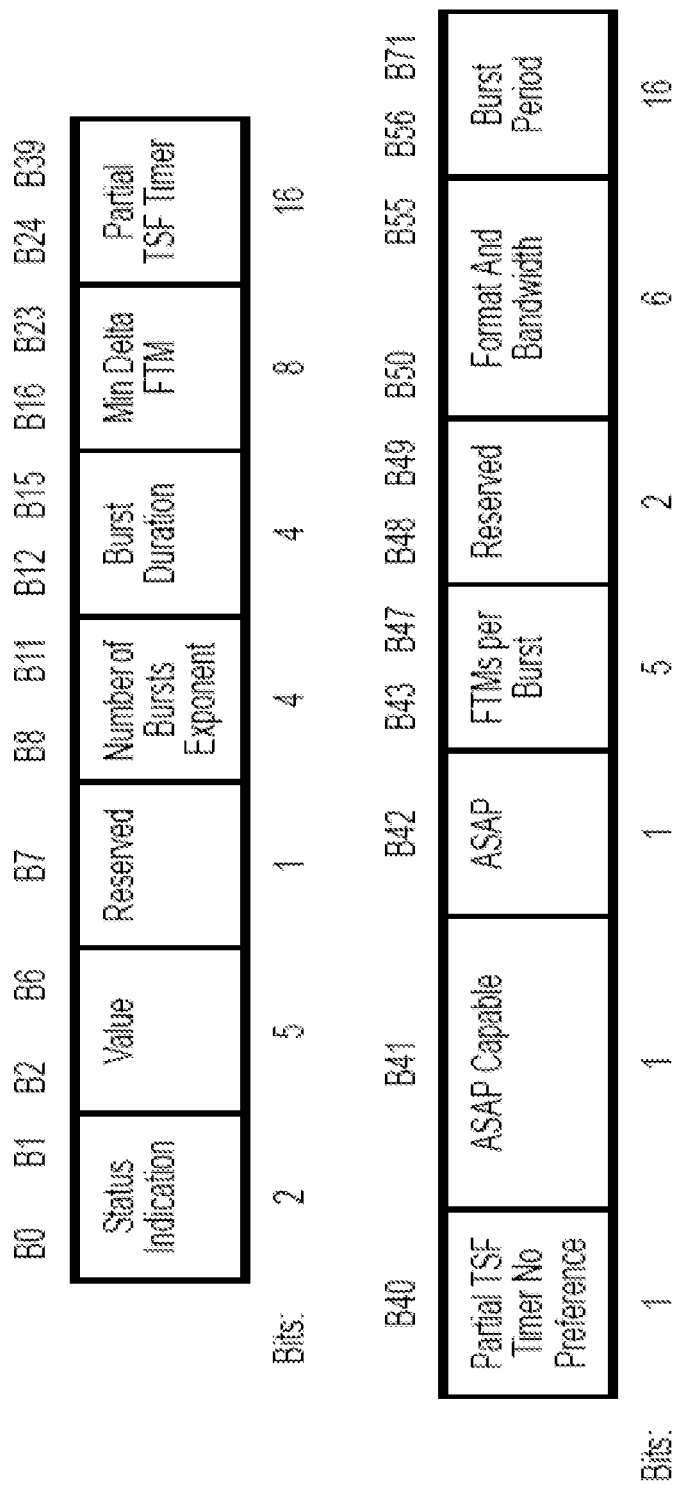
FIG. 4 is a block diagram of an FTM Parameters field of the FTM procedure according to prior art.

The negotiating phase of the prior art FTM procedure is initiated by the initiating node sending an initial FTM Request frame 2.1 to the responding node. The initial FTM Request frame includes a prior art FTM Parameters field format, which is shown in FIG. 4. The FTM Parameters field contains scheduling parameters to describe number of FTM bursts and burst duration to be sent in the following measurement exchange phase. The initiating node also indicates, in a Format and Bandwidth field, bits B50-B55 of FIG. 4, a format and a bandwidth that the initiating node supports. The Format and Bandwidth field of the prior art FTM parameters field is shown in more detail in FIG. 5.

In response to the initial FTM Request 2.1, the responding node sends an ACK frame 2.2, followed by a first FTM frame 2.3, i.e., an initial FTM frame, back to the initiating node. The FTM frame also includes the FTM Parameters field. The responding node sets the format and bandwidth in the Format and Bandwidth field in the first FTM frame 2.3 to the same as in the FTM request frame 2.1 if the responding node supports the same format and bandwidth. If the responding node does not support the same format and bandwidth, the responding node may override the configurations in the request. However, the responding node shall not indicate a bandwidth wider than requested. The responding node shall not indicate a Very high Throughput, VHT, format if Directional Multi Gigabits, DMG, High Throughput, HT-mixed format or non-HT format was requested. The responding node shall not indicate an HT format if DMG or non-HT format was requested. The responding node shall not indicate a DMG format if VHT, HT-mixed or non-HT format was requested, see Section 11.24.6.3 of the IEEE 802.11-2016 FTM procedure. The negotiating phase ends by an ACK 2.4 sent from the initiating node to the responding node.

Figure 3:
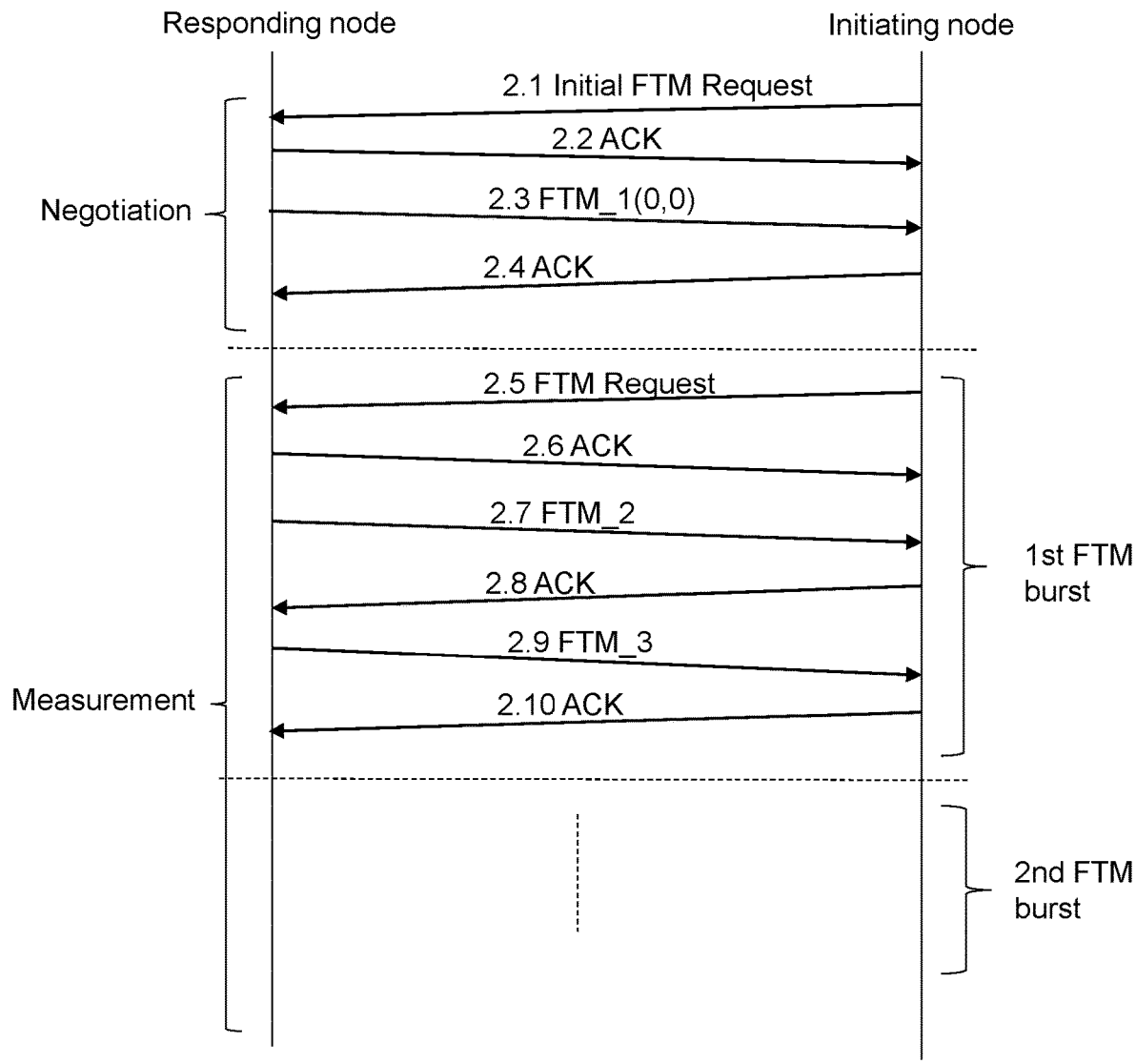
FIG. 3 is a signaling diagram illustrating an FTM procedure.

In the measurement exchange phase, FTM frames are sent during time windows called FTM bursts, as shown in FIG. 3. An FTM burst is defined by the scheduling configuration agreed in the negotiation phase. The measurement exchange phase starts by the initiating node transmitting a FTM request 2.5 to the responding node, which request functions as a trigger to the responding node. The FTM request 2.5 is transmitted without a Measurement Request element in the beginning of a burst to indicate to the responding node that the initiating node is available for the reminder of the burst instance. Then the responding node transmits a number of FTM frames 2.7, 2.9 with information of the time point when the FTM frames were sent as well as information of the time point when a respective ACK 2.8, 2.10 was received from the initiating node in response to the sent FTM frames. The timing information is used by the initiating node, together with timing information when the initiating node received FTM frames 2.7, 2.9 and sent ACKs 2.8, 2.10, to determine the time periods that the signals travel, which are used to determine distance between the responding node and the initiating node.

There may be many consecutive bursts, each comprising a number of FTM frames and ACKs sent. After the last burst ends, the FTM session terminates. Both the initiating node and the responding node can terminate the FTM session by sending a FTM frame with certain predefined configurations.

Figure 6:
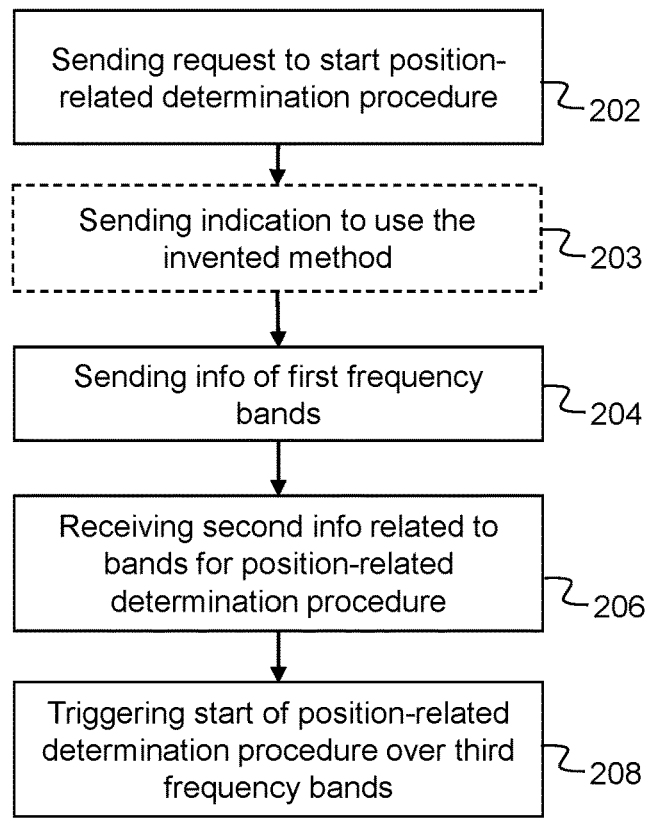
FIG. 6 is a flow chart illustrating a method performed by an initiating communication node, according to possible embodiments.

Different embodiment of the present invention will be described in the following. FIG. 6, in conjunction with FIG.

1, describes a method performed by an initiating communication node 110 for facilitating positioning determination in a Wi-Fi communication network 100. The Wi-Fi communication network comprises the initiating communication node 110 and a responding communication node 120 that is in wireless communication with the initiating communication node 110. The method comprises sending 202, to the responding communication node 120, a request to start a position-related determination procedure, and sending 204, to the responding communication node 120, information of a first plurality of frequency bands over which the initiating communication node 110 is able to communicate. The method further comprises receiving 206 second information from the responding communication node 120, the second information being related to a second number of frequency bands over which the responding communication node 120 is able to communicate, and triggering start 208 of the position-related determination procedure based on the received second information so that the position-related determination procedure is performed over at least one of a third number of frequency bands that occurs in both the first plurality of frequency bands and the second number of frequency bands.

The position-related determination procedure is performed between the initiating communication node and the responding communication node. The position-related determination procedure may be a procedure performed by sending signals between the initiating communication node and the responding communication node, which signals are used for determining the position of the initiating communication node and/or the position of the responding communication node. An example of such a position-related determination procedure is a measurement exchange phase of an FTM-based procedure. Another example is a ToF procedure, in which the time for wirelessly sending signals between the initiating communication node and the responding communication node is used for determining the distance between the initiating communication node and the responding communication node. ToF determination may be used in FTM. FTM or ToF measurements between the initiating and the responding communication node may be used together with similar measurements on signals sent from other communication nodes to e.g., the initiating communication node in order to determine the position of the initiating communication node using e.g., triangulation. The triggering of start of the position-related determination procedure may be performed by sending a trigger message to the responding communication node. The trigger message may comprise the at least one third number of frequency bands. That the third number of frequency bands occurs in both the first plurality of frequency bands and the second number of frequency bands signifies that the third number of frequency bands is the intersection of the first and second number of frequency bands, as defined in mathematical set theory. According to an embodiment, the described method is an improved variant of the negotiation phase of the prior art FTM procedure.

By such a method, it is possible for any of the initiating and responding communication node to determine which frequency bands they both can communicate over, i.e., that they have in common. The common frequency bands can then be used for a position-related determination procedure such as FTM. When the communication nodes have more than one frequency band in common, this handshake procedure enables the more than one frequency bands to be used, which results in a better position determination. For example, if a first and a second frequency band are in common for the initiating and the responding communication node, a first FTM procedure may be used for the first frequency band, resulting in a first measured distance between the initiating and the responding communication node, and a second FTM procedure may be used for the second frequency band, resulting in a second measured distance between the initiating and the responding communication node. Then, a mean value for the first and second measured distance may be taken as the determined value for the distance between the initiating and responding communication node. Other alternatives such as different weights to the first and second measured distance may of course be used as the determined value for the distance. The more frequency bands that are in common, i.e., the more measurements over different frequency bands that can be made, the better the precision of determined distance. Another possibility is for the initiating or responding communication node to select which one of the frequency bands they have in common that is to be used for position-related determinations. One frequency band could be better than the other depending on for example different transmission qualities, e.g., different signal strengths.

According to an embodiment, the position-related determination procedure is a measurement exchange phase of an FTM procedure, and the information of the first plurality of frequency bands over which the initiating communication node 110 is able to communicate is sent in an FTM parameters field format.

According to a variant of this embodiment, the information of the first plurality of frequency bands is sent in bits of the FTM parameters field format, dedicated for the information of the first plurality of frequency bands. For example, the prior art FTM parameters field format of IEEE 802.11-2016 may be extended with a plurality of new bits, e.g., 4 bits, which are to be the dedicated bits. According to an example, the dedicated bits may be bits B72-B75 of an extended FTM parameters field format. By having bits dedicated for information of the first plurality of frequency bands, the initiating communication node can easily signal to the responding communication node which frequency bands it can communicate over.

According to an embodiment, the method may further comprise sending 203, to the responding communication node 120, an indication whether the method for facilitating positioning determination in a Wi-Fi communication network is to be used or not. By sending such an indication, the responding node easily detects whether this inventive method is to be used or whether a prior art method is to be used, in response to the received request, such as the negotiation phase of existing FTM method according to IEEE 802.11-2016.

According to an embodiment, the indication is sent 203 in an existing bit of a FTM parameter field format. By using a bit that already exists in the FTM parameter field format of prior art, no additional data needs to be sent to indicate whether the prior art method or the inventive method is used. According to an embodiment, the existing bit is bit B7 of the FTM parameter field format. Bit B7 is today a reserved bit not used.

According to an embodiment, the received 206 second information is the information of the second number of frequency bands over which the responding communication node 120 is able to communicate. In this embodiment, the responding communication node informs the initiating communication node over which frequency bands (called second frequency bands) it can communicate, and the initiating communication node selects to communicate over all or some of the third frequency bands, i.e., the frequency bands that they have in common.

According to a variant of this embodiment, the position-related determination procedure is a measurement exchange phase of an FTM procedure and the information of the second number of frequency bands over which the responding communication node 120 is able to communicate is received in an FTM parameters field format. According to an embodiment, the information of the second number of frequency bands is received in bits of the FTM parameters field format, dedicated for the information of the second number of frequency bands. The prior art FTM parameters field format of IEEE 802.11-2016 may be extended with a plurality of new bits, e.g., 4 bits, which are to be the dedicated bits. The dedicated bits may be bits B72-B75 of an extended FTM parameters field format.

According to an embodiment, the initiating communication node 110 is a wireless communication station 130 and the responding communication node 120 is an access point 140. Further, the received second information, from the access point, comprises an instruction to the wireless communication station 130 to trigger start of the position-related determination procedure over the at least one of the third number of frequency bands, the instruction comprising information of the at least one third number of frequency bands. Hereby, the responding node 120 when being an access point 140 can decide which of the common frequency bands to use for the position-related determination procedure. The access point compares the information of first plurality of frequency bands with its own knowledge of the second number of frequency bands and determines the third number of common frequency bands. The access point then instructs the initiating node to start communicating using one or more of the common third frequency bands.

According to a variant of this embodiment, the position-related determination procedure is a measurement exchange phase of an FTM procedure. Further, the information of the at least one third number of frequency bands is received in an FTM parameters field format. The FTM parameters field format may for example be received in an FTM_1 frame. According to an example, the information of the at least one third number of frequency bands is received in a Format and Bandwidth field of the FTM parameters field format. There are in the prior art IEEE 802.11 specification a number of field values of the Format and Bandwidth field that are reserved for future use. By using such field values, the existing Format and Bandwidth size can be reused. According to an embodiment, field values 33-48 of the Format and Bandwidth field of the FTM parameters field format may be used to indicate which of up to 16 different combinations of frequency bands that the wireless communication station is to use for triggering start of the position-related determination procedure.

According to another variant of this embodiment, the at least one third number of frequency bands is the one of the third frequency bands that is determined to be the best frequency band to use for the position-related determination procedure. Which band that is "the best frequency band to use for the position-related determination procedure" may be determined in many different ways. For example, the frequency band having the highest signal quality may be determined to be the best band. Alternatively, it may be the band that has the most vacant transmission capacity. The access point may determine which third frequency. According to an embodiment, the information of the best third frequency band is received from the access point in an ACK message of the FTM procedure, the ACK message being received in response to the sent request to start the measurement exchange phase of the FTM procedure. For example, a Frame Control field of the ACK frame may be used for transmitting the information of the best third frequency band. More specifically, a Protocol Version subfield of the Frame Control field of the ACK frame as defined in IEEE 802.11 may be used, the Protocol Version field may consist of 2 bits.

According to another variant, the instruction from the access point comprises to use the third frequency band exclusively for the position-related determination procedure. That the third frequency band is to be used exclusively for the position-related determination procedure signifies that the third frequency band is to be used for no other purposes than for the position-related determination procedure, such as for data and control messages.

Figure 7:
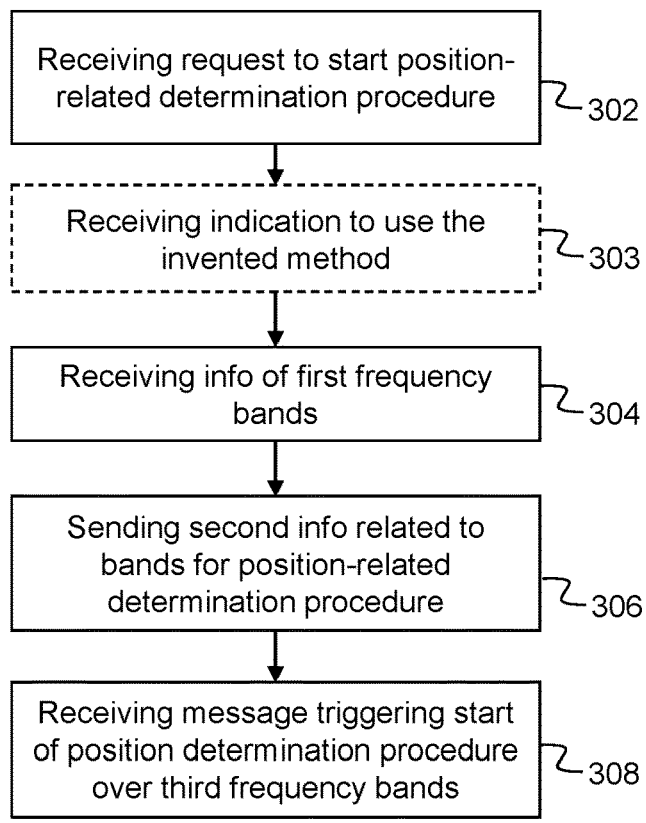
FIG. 7 is a flow chart illustrating a method performed by a responding communication node, according to possible embodiments.

FIG. 7, in conjunction with FIG. 1, describes a method performed by a responding communication node 120, for facilitating positioning determination in a Wi-Fi communication network 100. The Wi-Fi communication network comprises the responding communication node 120 and an initiating communication node 110, which is in wireless communication with the responding communication node 120. The method comprises receiving 302, from the initiating communication node 110, a request to start a position-related determination procedure, and receiving 304, from the initiating communication node 110, information of a first plurality of frequency bands over which the initiating communication node 110 is able to communicate. The method further comprises sending 306 second information to the initiating communication node 110, the second information being related to over which frequency bands the initiating communication node is to start the position-related determination procedure, the second information being based on the information of first plurality of frequency bands and on information of a second number of frequency bands over which the responding communication node 120 is able to communicate, and receiving 308, from the initiating communication node 110, a message triggering start of the position-related determination procedure over at least one of a third number of frequency bands that occurs in both the first plurality of frequency bands and in the second number of frequency bands.

According to an embodiment, the position-related determination procedure is a measurement exchange phase of an FTM procedure, and the information of the first plurality of frequency bands over which the initiating communication node 110 is able to communicate is received in an FTM parameters field format.

According to another embodiment, the information of the first plurality of frequency bands is received 304 in bits of the FTM parameters field format, dedicated for the information of the first plurality of frequency bands.

According to another embodiment, the method further comprises receiving 303, from the initiating communication node 110, an indication that the method for facilitating positioning determination in a Wi-Fi communication network is to be used. The indication may be received 303 in an existing bit of a FTM parameter field format.

According to another embodiment, the sent 306 second information is the information of the second number of frequency bands over which the responding communication node 120 is able to communicate.

According to another embodiment, the position-related determination procedure is a measurement exchange phase of an FTM procedure and the information of the second number of frequency bands over which the responding communication node 120 is able to communicate is sent in an FTM parameters field format. The information of the second number of frequency bands may be sent in bits of the FTM parameters field format, dedicated for the information of the second number of frequency bands.

According to an embodiment, the initiating communication node 110 is a wireless communication station 130 and the responding communication node 120 is an access point 140. Further, the second information sent 306 by the access point 140 comprises an instruction to the wireless communication station 130 to trigger start of the position-related determination procedure over the at least one of the third number of frequency bands, the instruction comprising information of the at least one third number of frequency bands.

According to another embodiment, the position-related determination procedure is a measurement exchange phase of an FTM procedure and the information of the at least one third number of frequency bands is sent in an FTM parameters field format. The information of the at least one third number of frequency bands may be sent in a Format and Bandwidth field of the FTM parameters field format. The at least one third number of frequency bands may be the one of the third frequency bands determined to be the best frequency band to use for the position-related determination procedure.

According to an embodiment, the information of the best third frequency band is sent to the wireless communication station 130 in an ACK message of the FTM procedure, the ACK message being sent in response to the received request to start the measurement exchange phase of the FTM procedure.

According to another embodiment, the instruction to the wireless communication station 130 comprises to use the third frequency band exclusively for the position-related determination procedure.

In the following, exemplifying embodiments of the invention are shown using the Wi-Fi technology based on the IEEE 802.11 standards. These embodiments propose changes to the negotiating phase of the prior art FTM procedure described in FIGS. 3-5.

In a first embodiment, it is decided that an initiating node and a responding node use all frequency bands that they have in common for localization purposes, i.e., the frequency bands that both the initiating node and the responding node can communicate over. Alternatively, two or more common frequency bands are used. This first embodiment is advantageous when sufficient communication resources are available at the communication interface between the initiating and responding communication node, when the communication nodes are capable of transmitting and receiving on all common frequency bands and not limited by power, e.g., battery power shortage or an any other resource shortage. Depending on traffic conditions on each frequency band, time needed for position estimation could largely vary among the frequency bands. For example, if a certain frequency band is used by many STAs, it will take a longer time for an initiating STA to access the certain frequency band and run the whole FTM procedure than if the certain frequency band is used by few STAs. Moreover, each frequency band provides a certain localization accuracy. According to a variant of this embodiment, position estimated from different frequency bands can be merged with a weighted average, where e.g., the weight is dependent on estimated accuracy for the individual frequency bands.

Figure 8:
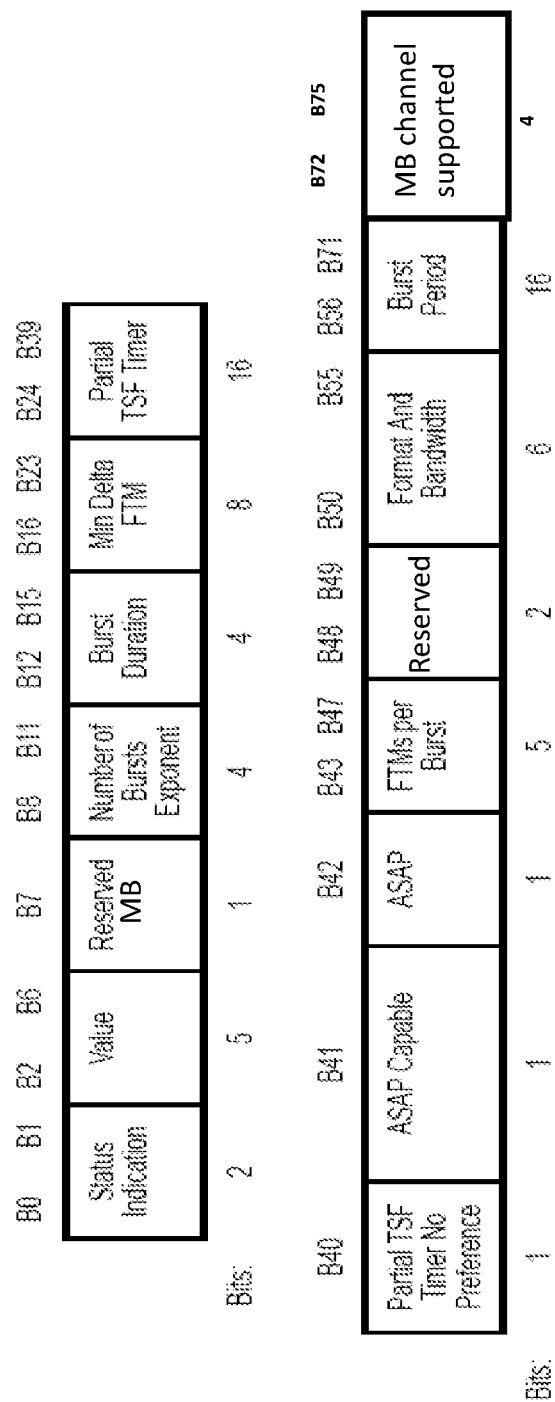
FIG. 8 is a block diagram of an FTM Parameters field according to an embodiment.

In order for the initiating node and the responding node to handshake the frequency bands that they have in common, an extension is suggested to the prior art FTM protocol described in FIGS. 3-5. According to an embodiment, a specific indication for multiband FTM procedure is sent in the initial FTM request frame 2.1 (FIG. 3) during the FTM negotiation phase. For this reason, it is proposed to amend the prior art FTM Parameters field described in FIG. 4 by inserting an indication whether this new multi-band FTM procedure is used or the whether the prior art FTM procedure is used. Also, an indication which frequency bands can be used is inserted. An example design for such an amended FTM parameters field enabling multiband is shown in FIG. 8. The amended FTM parameters field enabling multiband is in the following called a Multiband, MB, FTM parameters field. This new field is backward compatible with the prior art FTM Parameters field, since both are defined as having variable size and being optional.

As can be seen when comparing FIG. 8 with FIG. 4, an MB flag (MB) has been inserted as bit B7, which was a "Reserved" bit in the prior art. The MB flag is an indication whether the new process enabling MB FTM is to be used or whether the prior art FTM process is to be used. The decoder at the communication node receiving the signal can distinguish between the MB FTM parameter field and the prior art FTM parameter field by checking the bit B7. If B7=1, then an MB-FTM Parameter field is being received, if B7=0 an FTM Parameter field is being received.

The MB Capability bit B7 information indicates whether a communication node can transmit and receive on multiple frequency bands or not. Taking IEEE 802.11az, TGaz, as an example, a communication node may support transmissions on all TGaz carrier frequencies, (i.e., sub GHz, 2.4 GHz, 5 GHz and 60 GHz) or only on a subset of them. Which carrier frequencies the communication node supports is signaled in the MB-FTM Parameter field. According to an example, this is signaled by means of bits B72 and B75 as shown in FIG. 8. Those bits are novel bits compared to the prior art FTM Parameter field. Going back to the TGaz example, if all 4 carrier frequencies are available, there are 2^4=16 permutations to consider, and therefore 4 bits are needed to carry this information. The table of FIG. 9 shows possible choices for bit sequence B72-B75 and the corresponding meaning. Notice that if bit B7=0, additional bits B72-B75 are not transmitted at all.

Consequently, when this MB FTM process is used in the prior art FTM procedure described in FIG. 3, the initiating node sends in its initial FTM Request 2.1 an MB FTM Parameters field in which bit B7=1. This indicates that the initiating node supports more than one frequency band and that it would like to use the novel multiband FTM process. The MB FTM Parameters field further comprises bits B72-B75 set to for example 0011, which means that the initiating node supports 5 GHz and 60 GHz (see FIG. 9). The responding node responds by an FTM_1 2.3 also using the MB FTM parameters field, in which the responding node indicates that it agrees to use the MB FTM process (B7=1) and bits B72-B75 set to for example 0111, indicating that it supports 2.4, 5 and 60 GHz. As the initiating node receives the FTM_1 it can now for example decide to use the frequency bands that they have in common, i.e., 5 and 60 GHz. The selected frequency bands to use when entering the measurement exchange phase may be indicated in the FTM Request 2.5.

In a second embodiment, the initiating communication node decides to use for localization purposes only the "best" subset of the frequency bands that both the initiating node and the responding node support. The best subset may comprise one or more frequency bands. The "best" subset can be selected based on various factors, such as

- Depending on if there are line-of-sight, LOS, or non-line-of-sight, NLOS, conditions between the responding node and the initiating node, different bands may be better suitable. Lower frequencies typically have better transmission (penetration) capabilities, while higher frequencies have a larger tendency to reflect.
- Accuracy required: Due to inherent channel propagation characteristics, different bands provide different accuracy. The main factor here is the available channel bandwidth. Larger bandwidth provides for better accuracy.
- System load, i.e., traffic and/or interference conditions, on each band: STAs use Listen-Before-Talk, LBT, protocol to access a frequency band and then exchange messages with other STAs or APs or anchors and when traffic or interference is very dense, positioning operation are slowed down as well. An anchor is a sensor node with known location that is used for positioning, and not for communication. As a consequence, an STA will prefer to operate on less crowded and interfered bands.
- Device capability to transmit/receive on certain frequency bands, availability of other APs or STAs or anchors for message exchange on various frequency bands. A device may be able or not to transmit in certain available frequency band. Another limitation could be the absence of other devices needed for packet exchange for localization purposes.

In this second embodiment, the initiating communication node may, according to an embodiment, be an STA, and the responding communication node may be an AP. During the FTM negotiation phase, the STA receives guidance from the AP on which frequency bands the STA should use for the FTM measurement exchange. The AP may direct the STA to a different set of frequency bands, possibly a single frequency band, for the FTM procedure than where the original FTM request was made on. For example, in the Initial FTM Request, the STA informs over which frequency bands it can communicate, and the AP responds, e.g., in the FTM_1, with instructions over which of these frequency bands the FTM measurement exchange should take place.

As mentioned above, the information sent from the AP to the STA over which frequency bands that the FTM measurement exchange is to be performed may be carried in the FTM_1 2.3 sent in the negotiation phase (FIG. 3). A possible use is as follows: In the negotiation phase, the AP in response to the received initial FTM request 2.1, sends an FTM_1 to the STA including the FTM Parameter field (FIG. 4), which in bits B50-B55 of the prior art FTM Parameter field includes the Format and Bandwidth field (FIG. 5). As it can be seen in FIG. 5, in the prior art Format and Bandwidth field, there is large number of Field Values in the Format and Bandwidth field that are "Reserved" for future use. For example Field values 17-30 as well as 32-63 are reserved. Any of these Field values can be used to let the AP direct the STA to a certain subset of the frequency bands for the FTM measurement exchange phase. For example, Field Values 33 to 48 may be used to let the AP direct the STA to one or some of the frequency bands that the STA informed the AP that it supports in the initial request, for the FTM measurement exchange phase. If 4 carrier frequencies are available as in TGaz, i.e., sub GHz, 2.4 GHz, 5 GHz and 60 GHz, there are 2^4=16 permutations to consider. Some of the 16 Field Values and possible meanings are listed in FIG. 10.

In a third embodiment, the initiating communication node decides to use for localization purposes only the "best" frequency band that both the initiating node and the responding node support. The third embodiment is therefore in its context similar to the second embodiment. However, this time only one frequency band is selected, whereas in the second embodiment the selected subset of best frequency bands could have been one or more than one frequency bands. The "best" frequency band is selected based on for example any of the factors mentioned in the second embodiment.

In this third embodiment, the initiating communication node may be an STA, and the responding communication node may be an AP. During the FTM negotiation phase, the STA receives guidance from the AP on which frequency band the STA should use for the FTM measurement exchange. The AP directs the STA to a single frequency band for the FTM procedure of the frequency bands that the STA has indicated that it supports. In the Initial FTM Request, the STA informs over which frequency bands it can communicate, and the AP responds, e.g., in the ACK message 2.2 (FIG. 3), with instructions over which one of these frequency bands the FTM measurement exchange should take place. The format of the prior art ACK message is shown in FIG. 11. The MAC Header of the ACK message has a Frame Control field with 2 octets, i.e., 16 bits. The sub-fields of the Frame Control field is shown in FIG. 12. In today's usage, the 2 first bits of the Frame Control fields, i.e., B0 and B1 is used to indicate a protocol version. These two bits is today by default set to 00. This will only be changed when a fundamental incompatibility exists between a new revision and the prior edition of the IEEE 802-standard, which to date has not happened. Therefore, according to an alternative of the third embodiment, it is proposed to use the two Protocol Version bits for the AP to give guidance to the STA on which frequency the STA should use for the FTM measurement exchange phase. The AP may for a TGaz example direct the STA to a different frequency according to the example shown in FIG. 13. As shown here, bit value 00 of bits B0 and B1 means that the STA should use the sub GHz frequency band for the measurement exchange phase, bit value 01 means that the STA should use the 2.4 GHz frequency band, etc. It is possible for the AP to use these two bits of the ACK message as the alternatives are only four, if there are four frequency bands to choose from and the AP only instructs the STA to use one frequency band for the measurement exchange phase. By using the existing ACK message instead of the FTM-1, there is no need to add additional fields in the FTM-1 frames.

According to a fourth embodiment, one frequency band is dedicated for exclusive positioning purposes, while the other frequency bands are used for other purposes, e.g., data and control messages. In the fourth embodiment, the initiating communication node may be an STA and the responding communication node may be an AP. For the FTM procedure, in response to the received FTM Request from the STA, the AP chooses a certain frequency band that in the specific conditions can best support the positioning needs for example in terms of line of sight, available bandwidth, device capabilities, propagation conditions (e.g., path loss, fading . . . ). The AP then informs the STA on which band in a certain area that is reserved for positioning. This may be performed as in a similar way as described in the third embodiment. For example, the 2-bits Protocol Version field in the Frame Control subfield of the ACK Frame (FIG. 12) can be used to signal which frequency band should be used for FTM measurement exchange phase. The same example as in FIG. 13 can be used for this purpose.

Figure 14:
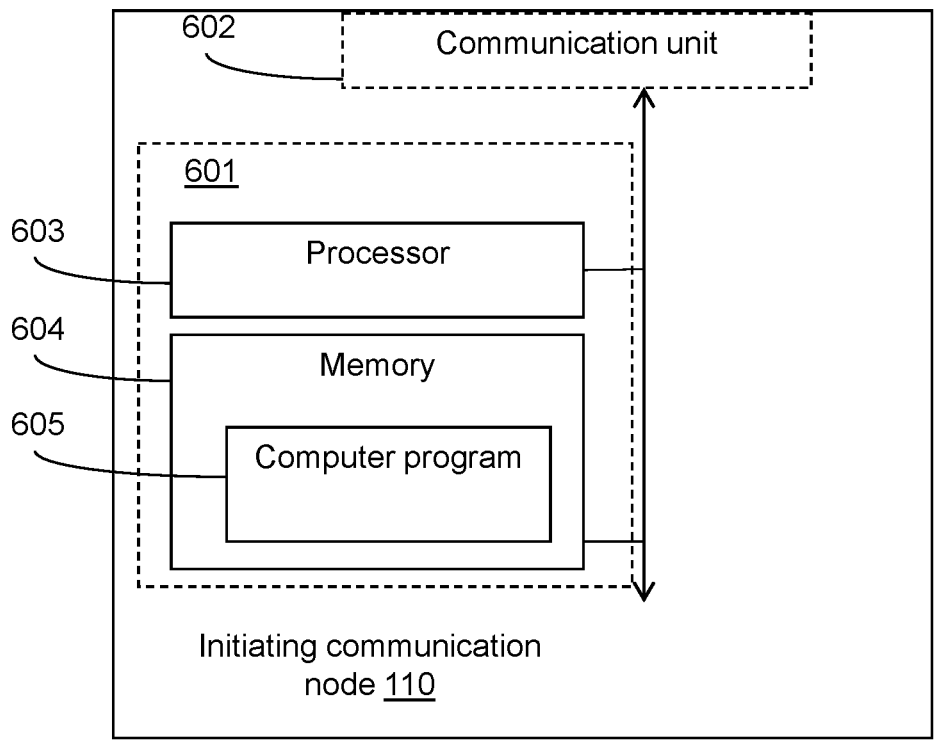
FIGS. 14-15 are block diagrams illustrating an initiating communication node in more detail, according to further possible embodiments.

FIG. 14, in conjunction with FIG. 1, shows an initiating communication node 110 operable in a Wi-Fi communication network 100, the Wi-Fi communication network comprising the initiating communication node 110 and a responding communication node 120 configured to be in wireless communication with the initiating communication node 110. The initiating communication node 110 comprises a processor 603 and a memory 604. The memory contains instructions executable by said processor, whereby the initiating communication node 110 is operative for sending, to the responding communication node 120, a request to start a position-related determination procedure and sending, to the responding communication node 120, information of a first plurality of frequency bands over which the initiating communication node 110 is able to communicate. The initiating communication node 110 is further operative for receiving second information from the responding communication node 120, the second information being related to a second number of frequency bands over which the responding communication node 120 is able to communicate, and triggering start of the position-related determination procedure based on the received second information so that the position-related determination procedure is performed over at least one of a third number of frequency bands that occurs in both the first plurality of frequency bands and the second number of frequency bands.

According to an embodiment, the position-related determination procedure is a measurement exchange phase of an FTM procedure, and the initiating communication node 110 is operative for sending the information of the first plurality of frequency bands over which the initiating communication node 110 is able to communicate in an FTM parameters field format. Further, the initiating communication node 110 may be operative for sending the information of the first plurality of frequency bands in bits of the FTM parameters field format dedicated for the information of the first plurality of frequency bands.

According to another embodiment, the second information is the information of the second number of frequency bands over which the responding communication node 120 is able to communicate. Further the position-related determination procedure may be a measurement exchange phase of an FTM procedure and the initiating communication node 110 may be operative for receiving the information of the second number of frequency bands over which the responding communication node 120 is able to communicate in an FTM parameters field format. Further, the initiating communication node 110 may be operative for receiving the information of the second number of frequency bands in bits of the FTM parameters field format, dedicated for the information of the second number of frequency bands.

According to another embodiment, further referring to FIG. 2, the initiating communication node 110 is a wireless communication station 130 and the responding communication node 120 is an access point 140. Further, the second information that the wireless communication station 130 is operative for receiving from the access point 140 comprises an instruction to the wireless communication station 130 to trigger start of the position-related determination procedure over the at least one of the third number of frequency bands, the instruction comprising information of the at least one third number of frequency bands. According to a variant of this embodiment, the position-related determination procedure is a measurement exchange phase of an FTM procedure and the wireless communication station 130 is operative for receiving the information of the at least one third number of frequency bands in an FTM parameters field format. Further, the initiating communication node 110 may be operative for receiving the information of the at least one third number of frequency bands in a Format and Bandwidth field of the FTM parameters field format.

According to another embodiment, the at least one third number of frequency bands is the one of the third frequency bands that is determined to be the best frequency band to use for the position-related determination procedure. Further, the initiating communication node 110 may be operative for receiving the information of the best third frequency band from the access point in an ACK message of the FTM procedure, the ACK message being received in response to the sent request to start the measurement exchange phase of the FTM procedure.

According to another embodiment, the instruction that the wireless communication station is configured to receive from the access point comprises to use the third frequency band exclusively for the position-related determination procedure.

According to other embodiments, the initiating communication node 110 may further comprise a communication unit 602, which may be considered to comprise conventional means for Wi-Fi communication with a responding communication node 120, such as wireless transceiver. The instructions executable by said processor 603 may be arranged as a computer program 605 stored e.g., in said memory 604. The processor 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

The computer program 605 may be arranged such that when its instructions are run in the processor, they cause the initiating communication node 110 to perform the steps described in any of the described embodiments of the initiating communication node 110. The computer program 605 may be carried by a computer program product connectable to the processor 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity connected to the Wi-Fi communication network to which the initiating communication node 110 has access via the communication unit 602. The computer program 605 may then be downloaded from the server into the memory 604.

Figure 15:
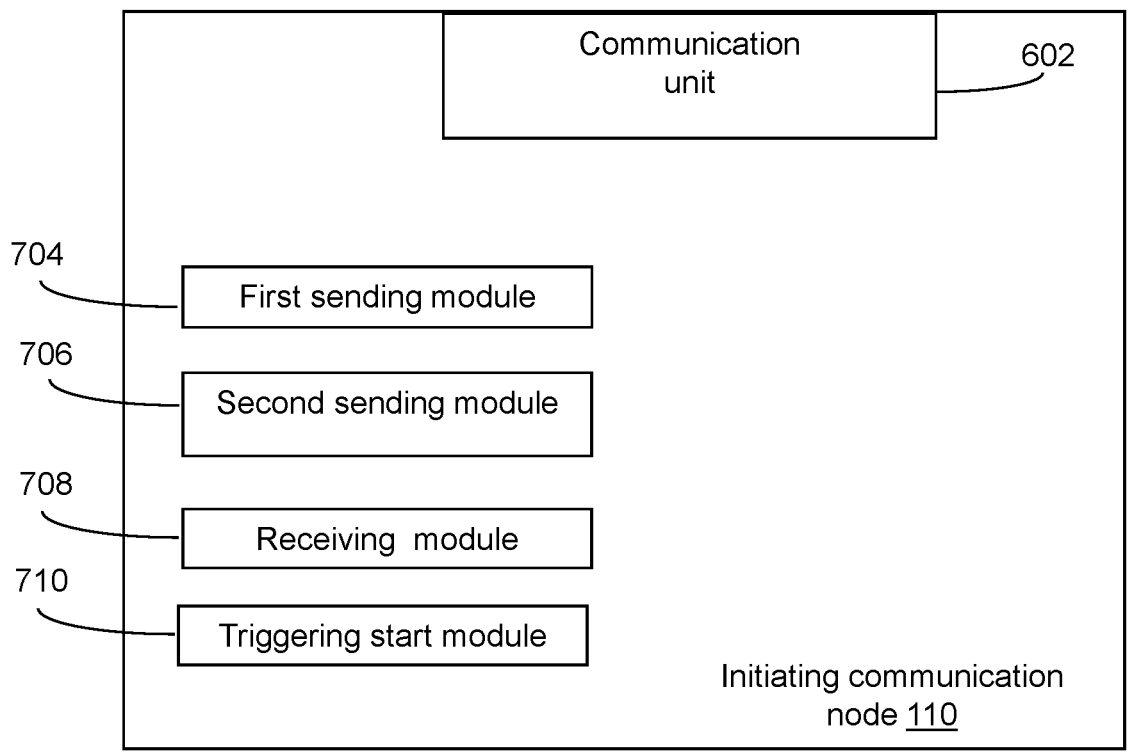

FIG. 15, in conjunction with FIG. 1, describes another embodiment of an initiating communication node 110 operable in a Wi-Fi communication network 100, the Wi-Fi communication network comprising the initiating communication node 110 and a responding communication node 120 configured to be in wireless communication with the initiating communication node 110. The initiating communication node 110 comprises a first sending module 704 for sending, to the responding communication node 120, a request to start a position-related determination procedure, and a second sending module 706 for sending, to the responding communication node 120, information of a first plurality of frequency bands over which the initiating communication node 110 is able to communicate. The initiating communication node 110 further comprises a receiving module 708 for receiving second information from the responding communication node 120, the second information being related to a second number of frequency bands over which the responding communication node 120 is able to communicate, and a triggering start module 710 for triggering start of the position-related determination procedure based on the received second information so that the position-related determination procedure is performed over at least one of a third number of frequency bands that occurs in both the first plurality of frequency bands and the second number of frequency bands. The initiating communication node 110 may further comprise a communication unit 602 similar to the communication unit described in FIG. 14.

Figure 16:
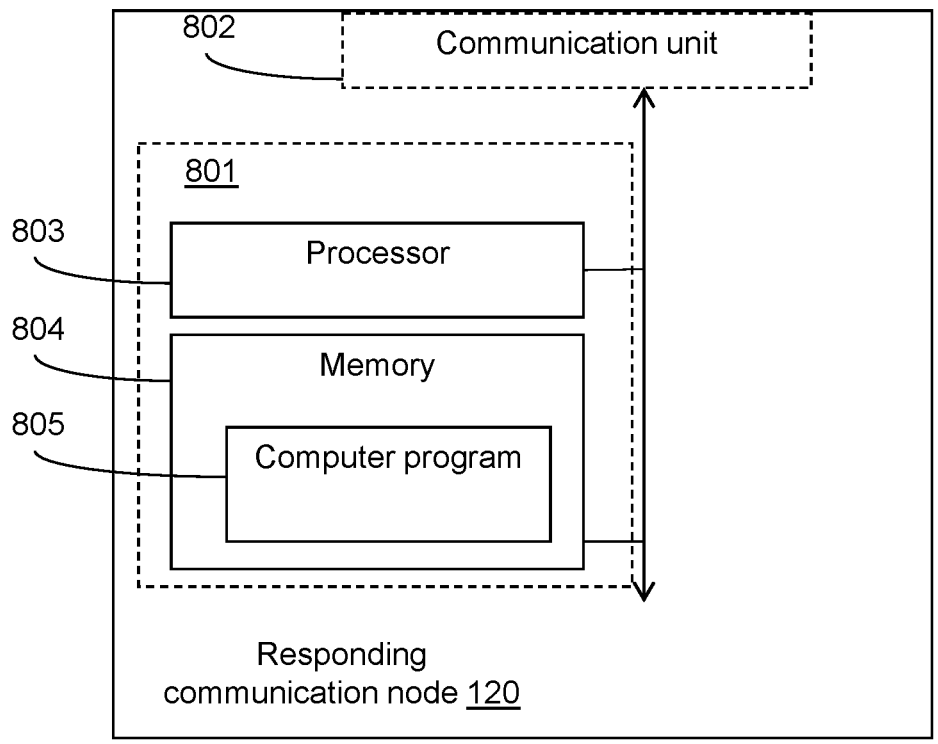
FIGS. 16-17 are block diagrams illustrating a responding communication node in more detail, according to further possible embodiments.

FIG. 16, in conjunction with FIG. 1, describes a responding communication node 120 operable in a Wi-Fi communication network 100, the Wi-Fi communication network comprising the responding communication node 120 and an initiating communication node 110 configured to be in wireless communication with the responding communication node 120. The responding communication node 120 comprises a processor 803 and a memory 804. The memory contains instructions executable by said processor, whereby the responding communication node 120 is operative for receiving, from the initiating communication node 110, a request to start a position-related determination procedure, and receiving, from the initiating communication node 110, information of a first plurality of frequency bands over which the initiating communication node 110 is able to communicate. The responding communication node 120 is further operative for sending second information to the initiating communication node 110, the second information being related to over which frequency bands the initiating communication node is to start the position-related determination procedure, the second information being based on the information of first plurality of frequency bands and on information of a second number of frequency bands over which the responding communication node 120 is able to communicate, and for receiving, from the initiating communication node 110, a message triggering start of the position-related determination procedure over at least one of a third number of frequency bands that occurs in both the first plurality of frequency bands and in the second number of frequency bands.

According to an embodiment, the position-related determination procedure is a measurement exchange phase of an FTM procedure, and the responding communication node 120 is operative for receiving the information of the first plurality of frequency bands over which the initiating communication node 110 is able to communicate in an FTM parameters field format. The responding communication node 120 may be operative for receiving the information of the first plurality of frequency in bits of the FTM parameters field format dedicated for the information of the first plurality of frequency bands.

According to another embodiment, the second information is the information of the second number of frequency bands over which the responding communication node 120 is able to communicate. Further, the position-related determination procedure may be a measurement exchange phase of an FTM procedure, and the responding communication node 120 may be operative for sending the information of the second number of frequency bands over which the responding communication node 120 is able to communicate in an FTM parameters field format. Also, it may be possible that the responding communication node 120 is operative for sending the information of the second number of frequency bands in bits of the FTM parameters field format dedicated for the information of the second number of frequency bands.

According to another embodiment, the initiating communication node 110 is a wireless communication station 130 and the responding communication node 120 is an access point 140. Further, the second information comprises an instruction to the wireless communication station 130 to trigger start of the position-related determination procedure over the at least one of the third number of frequency bands, the instruction comprising information of the at least one third number of frequency bands. Further, it may be possible that the position-related determination procedure is a measurement exchange phase of an FTM procedure and the responding communication node is operative for sending information of the at least one third number of frequency bands in an FTM parameters field format. In an alternative, the responding communication node 120 may be operative for sending the information of the at least one third number of frequency bands in a Format and Bandwidth field of the FTM parameters field format.

According to an embodiment, the at least one third number of frequency bands is the one of the third frequency bands determined to be the best frequency band to use for the position-related determination procedure. Further, it may be possible that the access point 140 is operative for sending the information of the best third frequency band to the wireless communication station 130 in an ACK message of the FTM procedure, the ACK message being sent in response to the received request to start the measurement exchange phase of the FTM procedure.

According to another embodiment, the instruction to the wireless communication station 130 comprises to use the third frequency band exclusively for the position-related determination procedure.

According to other embodiments, the responding communication node 120 may further comprise a communication unit 802, which may be considered to comprise conventional means for Wi-Fi communication with an initiating communication node 110, such as a wireless transceiver. The instructions executable by said processor 803 may be arranged as a computer program 805 stored e.g., in said memory 804. The processor 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above.

The computer program 805 may be arranged such that when its instructions are run in the processor 803, they cause the responding communication node 120 to perform the steps described in any of the described embodiments of the responding communication node 120. The computer program 805 may be carried by a computer program product connectable to the processor 803. The computer program product may be the memory 804, or at least may be arranged in the memory. The memory 804 may be realized as for example a RAM (Random-access memory), ROM (Read-Only Memory) or an EEPROM (Electrical Erasable Programmable ROM). Further, the computer program 805 may be carried by a separate computer-readable medium, such as a CD, DVD or flash memory, from which the program could be downloaded into the memory 804. Alternatively, the computer program may be stored on a server or any other entity connected to the Wi-Fi communication network to which the responding communication node 120 has access via the communication unit 802. The computer program 805 may then be downloaded from the server into the memory 804.

Figure 17:
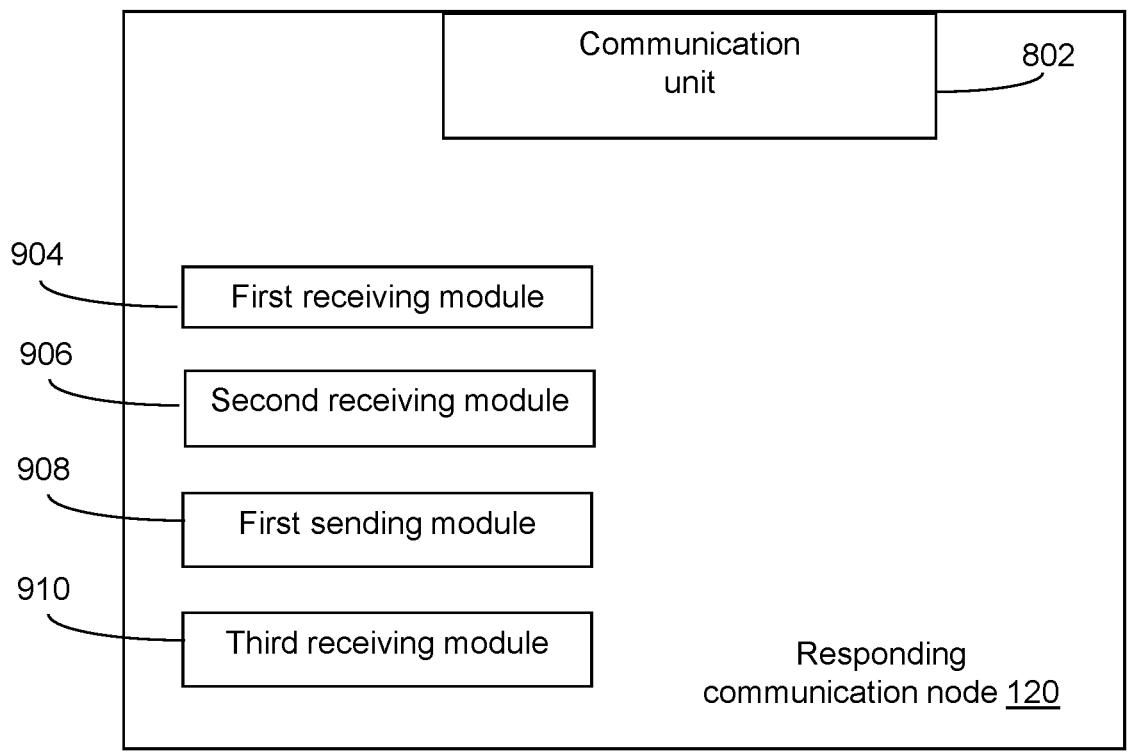

FIG. 17, in conjunction with FIG. 1, describes another embodiment of a responding communication node 120 operable in a Wi-Fi communication network 100, the Wi-Fi communication network comprising the responding communication node 120 and an initiating communication node 110 configured to be in wireless communication with the responding communication node 120. The responding communication node 120 comprises a first receiving module 904 for receiving, from the initiating communication node 110, a request to start a position-related determination procedure, and a second receiving module 906 for receiving, from the initiating communication node 110, information of a first plurality of frequency bands over which the initiating communication node 110 is able to communicate. The responding communication node 120 further comprises a first sending module 908 for sending second information to the initiating communication node 110, the second information being related to over which frequency bands the initiating communication node is to start the position-related determination procedure, the second information being based on the information of first plurality of frequency bands and on information of a second number of frequency bands over which the responding communication node 120 is able to communicate, and a third receiving module 910 for receiving, from the initiating communication node 110, a message triggering start of the position-related determination procedure over at least one of a third number of frequency bands that occurs in both the first plurality of frequency bands and in the second number of frequency bands. The responding communication node 120 may further comprise a communication unit 802 similar to the communication unit described in FIG. 16.

At least some of the embodiments presented enables multi-band Wi-Fi devices to make effective use of the set of available frequency bands for positioning purposes. The Wi-Fi device (STA or AP) is given the opportunity to use all, some or one of the available frequency bands depending e.g., on target scenarios, traffic load, interference and propagation conditions. This allows the Wi-Fi device to improve the positioning precision for various reasons: combine measurements from different bands; use less crowded/interfered, or unused frequency bands for positioning purposes; use the best suitable band for certain propagation conditions. Moreover, embodiments of this invention allow to reduce the time needed for positioning estimation, and in turn wireless medium usage, to some extent: under certain conditions, a Wi-Fi device is given the opportunity to use a certain frequency for exclusive localization purposes. This reduces the time needed for positioning estimation and therefore brings benefit in very dense scenarios where scalability is essential.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

What is claimed is:

1. A method performed by a first node in a Wi-Fi communication network, the method comprising:
   sending, to a second node in the Wi-Fi communication network, information of a first plurality of frequency bands over which the first node is able to communicate;
   receiving second information from the second node, the second information being related to a second number of frequency bands over which the second node is able to communicate; and
   triggering start of a position-related determination procedure based on the received second information so that the position-related determination procedure is performed over at least one frequency band that occurs in both the first plurality of frequency bands and the second number of frequency bands.

2. The method of claim 1, wherein the position-related determination procedure is a measurement exchange phase of a Fine Time Measurement (FTM) procedure, and the information of the first plurality of frequency bands over which the first node is able to communicate is sent in an FTM parameters field format.

3. The method of claim 2, wherein the information of the first plurality of frequency bands is sent in bits of the FTM parameters field format, dedicated for the information of the first plurality of frequency bands.

4. The method of claim 1, further comprising sending, to the second node, an indication that the sending, receiving, and triggering steps are to be performed.

5. The method of claim 4, wherein the indication is sent in an existing bit of a FTM parameter field format.

6. The method of claim 1, wherein the received second information is the information of the second number of frequency bands over which the second node is able to communicate.

7. A method performed by a first node in a Wi-Fi communication network, the method comprising:
   receiving, from a second node, information of a first plurality of frequency bands over which the second node is able to communicate;
   sending second information to the second node, the second information being related to over which frequency bands the second node is to start a position-related determination procedure, the second information being based on the information of the first plurality of frequency bands and on information of a second number of frequency bands over which the first node is able to communicate; and
   receiving, from the second node, a message triggering start of a position-related determination procedure over at least one frequency band that occurs in both the first plurality of frequency bands and in the second number of frequency bands.

8. The method of claim 7, wherein the position-related determination procedure is a measurement exchange phase of a Fine Time Measurement (FTM) procedure, and the information of the first plurality of frequency bands over which the second node is able to communicate is received in an FTM parameters field format.

9. The method of claim 8, wherein the information of the first plurality of frequency bands is received in bits of the FTM parameters field format, dedicated for the information of the first plurality of frequency bands.

10. The method of claim 7, further comprising receiving, from the second node, an indication that said receiving and sending steps are to be performed.

11. The method of claim 10, wherein the indication is received in an existing bit of a FTM parameter field format.

12. The method of claim 7, wherein the sent second information is the information of the second number of frequency bands over which the first node is able to communicate.

13. A first node configured for operation in a Wi-Fi communication network, the first node comprising:
   a processor; and
   a memory, said memory containing instructions executable by said processor, whereby the first node is configured to:
      send, to a second node in the Wi-Fi communication network, information of a first plurality of frequency bands over which the first node is able to communicate;
      receive second information from the second node, the second information being related to a second number of frequency bands over which the second node is able to communicate; and
      trigger start of a position-related determination procedure based on the received second information so that the position-related determination procedure is performed over at least one frequency band that occurs in both the first plurality of frequency bands and the second number of frequency bands.

14. The first node of claim 13, wherein the position-related determination procedure is a measurement exchange phase of a Fine Time Measurement (FTM) procedure, and wherein the first node is configured to send the information of the first plurality of frequency bands over which the first node is able to communicate in an FTM parameters field format.

15. The first node of claim 14, wherein the first node is configured to send the information of the first plurality of frequency bands in bits of the FTM parameters field format, dedicated for the information of the first plurality of frequency bands.

16. The first node of claim 13, wherein the second information is the information of the second number of frequency bands over which the second node is able to communicate.

17. The first node of claim 16, wherein the position-related determination procedure is a measurement exchange phase of a Fine Time Measurement (FTM) procedure and wherein the first node is configured to receive the information of the second number of frequency bands over which the second node is able to communicate in an FTM parameters field format.

* * * * *